US 7,240,215 B2

(12) United States Patent
Cabezas et al.

(10) Patent No.: US 7,240,215 B2
(45) Date of Patent: Jul. 3, 2007

(54) SYSTEM AND METHOD FOR ON-DEMAND COMPUTING FOR PARALLEL SCSI

(75) Inventors: Rafael Graniello Cabezas, Austin, TX (US); Thomas Richard Forrer, Jr., Round Rock, TX (US); Michael D. Leary, Austin, TX (US); Jason Eric Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 10/621,947

(22) Filed: Jul. 17, 2003

(65) Prior Publication Data

US 2005/0015603 A1    Jan. 20, 2005

(51) Int. Cl.
*G06F 9/00*    (2006.01)
(52) U.S. Cl. ................. 713/184; 713/168; 713/171
(58) Field of Classification Search ............... 713/184, 713/168, 171
See application file for complete search history.

(56) References Cited

U.S. PATENT DOCUMENTS 5,181,239 A * 1/1993 Jolissaint ................ 379/93.25
5,533,103 A * 7/1996 Peavey et al. ............. 379/69

OTHER PUBLICATIONS

"ADIC—Scalar 10K Capacity-on-Demand FAQ," www.adic.com/us/scalar10k/tech/faq.htm, printed Apr. 16, 2003 (3 pages).
"Capacity on demand," IBM, www-1.ibm.com/servers/eserver/iseries/ondemand/cod/index.html, printed Apr. 16, 2003 (1 page).

* cited by examiner

*Primary Examiner*—Thomas R. Peeso
(74) *Attorney, Agent, or Firm*—Van Leeuwen & Van Leeuwen; D'Ann N. Rifai

(57) ABSTRACT

A system and method for managing parallel SCSI device functionality is presented. A user sends a request to a vendor whereby the request corresponds to the user changing the functionality of one of the user's SCSI devices. The vendor generates and sends a key that includes a password and a functionality value to the user. The user extracts the password, extracts the functionality value, and includes them in a command descriptor block. The user includes the command descriptor block in a SCSI command, and sends the SCSI command to the user's SCSI device whereupon the SCSI device validates the password and reconfigures itself based upon the functionality value. The SCSI device returns a message to the user indicating whether the reconfiguring process was successful. In turn, the user forwards the message to the vendor so the vendor may bill the user accordingly.

20 Claims, 8 Drawing Sheets

200 ⟶

| Change Definition Command CDB (Command Descriptor Block) |||||||||
|---|---|---|---|---|---|---|---|---|
| | Bit 7 | Bit 6 | Bit 5 | Bit 4 | Bit 3 | Bit 2 | Bit 1 | Bit 0 |
| Byte 0 | Operation Code (40h) |||||||||
| Byte 1 | Reserved |||||||||
| Byte 2 | Reserved ||||||| | HR |
| Byte 3 | Vendor Specific 2 |||| Definition Parameter ||||
| Byte 4 | Vendor Specific 3 |||| Vendor Specific 1 ||||
| Byte 5 | Password |||||||||
| Byte 6 | Password |||||||||
| Byte 7 | Password |||||||||
| Byte 8 | Parameter Data Length |||||||||
| Byte 9 | Control |||||||||

| Vendor Specific 1 (Functionality Field) ||
|---|---|
| Value | Definition |
| 00h | No Capacity Change |
| 01h | Use Maximum Capacity |
| 02h | Limit Capacity to 4.5 GB |
| 03h | Limit Capacity to 18.2 GB |
| 04h | Limit Capacity to 36.4 GB |
| 05h | Limit Capacity to 73.4 GB |
| 06h | Limit Capacity to 146.8 GB |
| 07h | Limit Capacity to 300 GB |
| 08h-1fh | Reserved |

*Figure 3*

SYSTEM AND METHOD FOR ON-DEMAND COMPUTING FOR PARALLEL SCSI

BACKGROUND OF THE INVENTION

1. Technical Field

The present invention relates in general to a system and method for managing the functionality of parallel Small Computer System Interface (SCSI) devices. More particularly, the present invention relates to a system and method for using SCSI commands and protocol to inherently control a SCSI device's functionality.

2. Description of the Related Art

Computer technology is advancing at an exceptional rate. Hard drive capacities, bus speeds, and processor speeds are doubling every few years. In many cases, a user may not require computer equipment with the latest advancement in technology. However, the user may be unsure of his future needs in which the user is faced with a decision of whether to purchase older technology computer equipment with a limited lifespan or spending more money to purchase newer technology computer equipment. For example, a user may require 10 gigabytes (GB) of storage capacity when he starts a business, but may soon require 100 GB of storage when the business becomes successful. A challenge found for a user is identifying a correct amount of computer equipment functionality that meets the user's current and future requirements.

Vendors offer an approach to support a user's changing functionality requirements which is termed "capacity on demand." Using this approach, a vendor may sell or lease computer equipment to a user on a "functionality as needed" basis. A vendor provides a user with a system where a portion of the system's capability is enabled. For example, the system may include multiple processors and the user only pays for the processors he uses at the present time. In this example, the user later determines that he needs additional processors and contacts the vendor. The vendor provides a key to the user that the user enters into the system using a client console which results in client software enabling an additional processor or processors. Additional system memory may be enabled using the same protocol. The key may be distributed by a vendor to a user in various ways. For example, the user may receive a key telephonically. In another example, the user may receive an electronic key that is plugged into a special system port (i.e. USB port). In yet another example, the vendor may remotely log into the user's system and remotely enable additional resources.

A challenge found with existing "functionality as needed" approaches, however, is that functionality limitation management is enforced by higher-level system software and not within a device itself. For example, if a "functionality as needed" hard drive is moved to a different computer system and reformatted to destroy any data stored on the hard drive that identifies the hard drive or its limitation, the different computer system does not know the hard drive's allocated limitations and the entire capacity of the hard drive becomes available.

What is needed, therefore, is a system and method for managing a device's functionality level such that the functionality level is managed inherently in the device.

SUMMARY

It has been discovered that the aforementioned challenges are resolved by using a standard SCSI command to inherently manage the functionality level of a SCSI device. A user's customer computing device receives a functionality value and a password from a vendor that corresponds to changing the functionality of one of the user's SCSI device. The user's customer computing device inserts the functionality value and password into a SCSI command, and sends the SCSI command to the SCSI device. The SCSI device validates the password and inherently changes its functionality based upon the functionality value included in the SCSI command.

A user wishes to change the functionality of one of his SCSI devices. For example, a user's SCSI device may be allocating 10 GB of a 100 GB hard drive and the user wishes to increase its allocation of the hard drive to 50 GB. The user sends a functionality request to a vendor either telephonically or by using the user's customer computing device (i.e. server, personal computer, etc.). The request includes the SCSI device's serial number and may also include a functionality change amount. Using the example described above, the functionality request may include the SCSI hard drive's serial number and a request to increase the SCSI device's functionality up to 50 GB.

The vendor receives the functionality request and generates an encrypted key that includes a password and a functionality value. The password is the same password that the vendor configured in the SCSI device when the vendor provided the SCSI device to the user. The functionality value corresponds to particular functionality levels of the SCSI device. For example, a SCSI device may be a 100 GB hard drive which may be configured to allocate 10 GB, 30 GB, 50 GB, or 100 GB of storage capacity to a user. In this example, each storage capacity level has a corresponding functionality value. The encrypted key is generated using standard scrambling techniques, such as a private key/public key technique.

The vendor sends the key to the user's customer computing device whereby the customer computing device receives and decrypts the key. In turn, the customer computing device generates a command descriptor block using the password and functionality value included in the key. The customer computing device inserts the command descriptor block into a SCSI command and sends the SCSI command to the SCSI device. The SCSI device extracts the password and functionality value whereupon, upon extraction, the SCSI device validates the password and reconfigures itself using the functionality value.

The SCSI device sends a message to the customer computing device which includes an acknowledgement message, a password error message, or a functionality error message. An acknowledgement message signifies that the SCSI device accepted the command descriptor block and reconfigured itself using the functionality value. A password error message signifies that the password included in the command descriptor block is invalid. A functionality error message, however, signifies that the functionality value included in the command descriptor block is invalid. For example, the SCSI device may have a maximum capacity of 100 GB and the SCSI command's functionality value corresponds to a request to increase the SCSI device's capacity to 150 GB. In this example, the SCSI device sends a functionality error message to the customer computing device indicating the functionality value error.

The customer computing device forwards the SCSI device's message to the vendor who analyzes the message and bills the user for the functionality increase if the functionality increase is successful. If the functionality increase is not successful, the vendor notifies personnel, such as a system administrator.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 2 is a change definition command CDB (command descriptor block) showing various field attributes;

FIG. 3 is an example of a functionality field look-up table used by a vendor during key generation;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
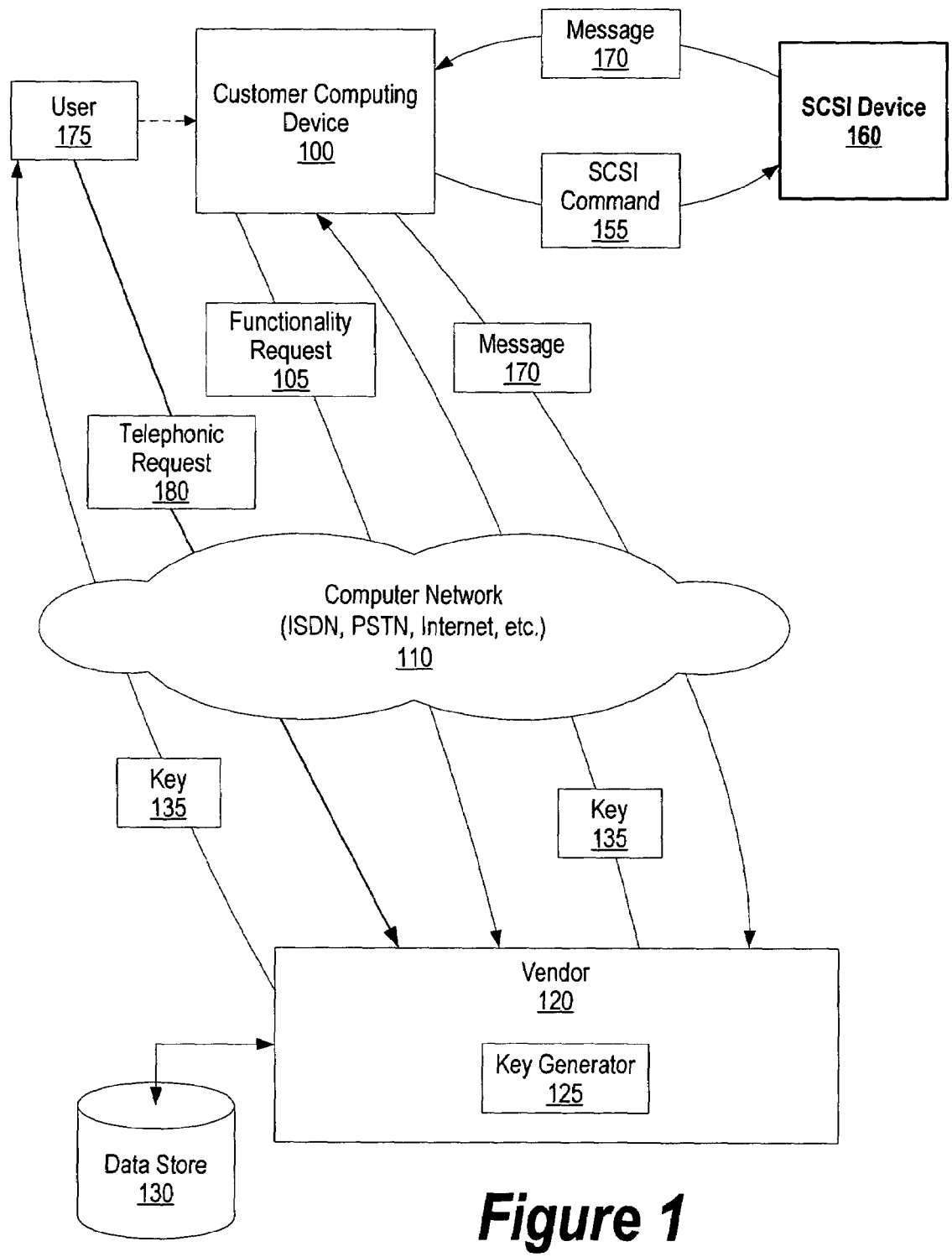
FIG. 1 is a diagram showing a user increasing a SCSI device's functionality using information the user received from a vendor.

FIG. 1 is a diagram showing a user increasing a SCSI device's functionality using information the user received from a vendor. User 175 wishes to increase his computing device's (e.g. customer computing device 100) allocated functionality of SCSI device 160. For example, SCSI device 160 may be a 100 Gigabyte (GB) hard drive which is currently configured for customer computing device 100 to use 50 GB of the 100 GB storage capacity. Customer computing device 100 is a computing device which user 175 uses to access SCSI device 160 (i.e. a server, a personal computer, etc.).

Vendor 120 supports SCSI device 160 for user 175. For example, vendor 120 may be a third party storage provider which has a contract with user 175 for customer computing device 100 to use a particular amount of storage capacity included in SCSI device 160. Customer computing device 100 sends functionality request 105 to vendor 120 through computer network 110, such as the Internet. Functionality request 105 may include SCSI device 160's serial number and may also include a request amount that user 175 wishes to increase SCSI device 160's functionality. Using the example described above, functionality request 105 may include SCSI device 160's serial number and a request to increase SCSI device 160's functionality up to 80 GB. In one embodiment, user 175 may provide functionality request information telephonically to vendor 120, such as telephonic request 180, through computer network 110, such as the public switched telephone network (PSTN).

Vendor 120 receives functionality request 105 (or telephonic request 180) and uses key generator 125 to generate a key that includes a functionality value and a password which it retrieves from data store 130. The password is the same as SCSI device 160's password which was previously configured by vendor 120. For example, vendor 120 may have configured a default password in SCSI device 160 at the time that vendor 120 installed SCSI device 160 for user 175. The functionality value corresponds to particular functionality levels of SCSI device 160. For example, SCSI device 160 may be a 100 GB hard drive whereby data store 130 includes functionality values corresponding to SCSI device 160 of 10 GB, 30 GB, 50 GB, 80 GB, and 100 GB (see FIG. 3 and corresponding text for further details regarding functionality values). Key generator 125 produces key 135 which is encrypted using standard scrambling techniques, such a private key/public key technique.

Vendor 120 sends key 135 to customer computing device 100 over computer network 110. In one embodiment, vendor 120 provides key 135 to user 175 telephonically over computer network 110 whereby user 175 inserts key 135 into customer computing device 100. Customer computing device 100 receives and decrypts key 135, and generates a command descriptor block using the password and functionality value included in key 135 (see FIGS. 2, 3, 6, and corresponding text for further details regarding command descriptor block properties and generation). Customer computing device 100 includes the command descriptor block in a SCSI command and sends SCSI command 155 to SCSI device 160. SCSI device 160 validates the password included in the command descriptor block, and re-configures itself based upon the functionality value included in the command descriptor block (see FIG. 7 and corresponding text for further details regarding command descriptor block analysis).

SCSI device 160 sends message 170 to customer computing device 100. Message 170 may include an acknowledgement message, a password error message, or a functionality error message. An acknowledgement message signifies that SCSI device 160 validated the password included in SCSI command 155 and reconfigured itself based upon the functionality value included in SCSI command 155. A password error message signifies that the password included in SCSI command 155 is invalid. A functionality error message signifies that the functionality value included in SCSI command 155 is invalid. For example, SCSI device 160 may have a maximum capacity of 100 GB and SCSI command 155's functionality value corresponds to a request to increase SCSI device 160's capacity to 150 GB (see FIG. 7 and corresponding text for further details regarding device messages).

Customer computing device 100 forwards message 170 to vendor 120 through computer network 110. Vendor 120 analyzes message 170, and bills user 175 for the functionality increase if the functionality increase is successful. If the functionality increase is not successful, vendor 120 notifies personnel, such as a system administrator.

FIG. 2 is a change definition command CDB (command descriptor block) showing various field attributes. A customer computing device (i.e. server, personal computer, etc.) sends a SCSI command which includes a command descriptor block to a SCSI device in order to change the functionality of the SCSI device. For example, a user may wish to increase the user's customer computing device's allocated capacity of a 100 GB hard drive from 40 GB up to 80 GB. In order to change a SCSI device's capacity, the user uses his customer computing device to send a request to a vendor whereupon the vendor returns a functionality value and a password (see FIGS. 1, 4 through 7, and corresponding text for further details regarding customer computing device functionality requests).

Command descriptor block 200 includes ten bytes, some of which are commonly used for reasons other than this invention. Fields that are used for this invention are vendor specific field 1 220 and password fields 230 through 250. Vendor specific 1 field 220 includes a functionality value corresponding to a client's functionality request. The functionality value is five bits in size (see FIG. 3 and corresponding text for further details regarding functionality values).

Password fields 230 through 250 include a vendor provided, three-byte password. A customer computing device inserts the password into command descriptor block 200, and includes command descriptor block in a SCSI command. The customer computing device sends the SCSI command to a SCSI device whereupon, upon reception, the SCSI device validates the password included in command descriptor block 200. If the password is valid, the SCSI device re-configures itself based upon the functionality value included in vendor specific 1 field 220. If the password is invalid, the SCSI device sends an error message to the customer computing device (see FIGS. 4 through 7 and corresponding text for further details regarding password generation and validation).

FIG. 3 is an example of a functionality field look-up table used by a vendor during key generation. The vendor includes one of the functionality values in a key and sends the key to a customer computing device. In turn, the customer computing device extracts the functionality value from the key and inserts the functionality value in a command descriptor block which is included in a SCSI command and sent to a SCSI device (see FIGS. 4 through 6 and corresponding text for further details regarding command descriptor block generation). The example shown in FIG. 3 corresponds to a particular storage device. As one skilled in the art can appreciate, other functionality field look-up tables may be create to support functionality levels of other devices, such as device bus speed, device media rotational speed, or optical capabilities (i.e. CDR, CDRW, DVDR, or DVDRW).

Look-up table 300 includes columns 310 and 320. Column 310 includes a list of functionality values corresponding to particular functionality levels that are defined in column 320. Row 350 shows that a functionality value of "00h" corresponds to no capacity change (i.e. no change in functionality). Row 355 shows that a functionality value of "01h" requests a storage device to allocate its maximum capacity to a client. For example, if a customer computing device sends a command descriptor block to a hard drive with a functionality value of "01h" to an 800 GB hard drive, the hard drive re-configures itself to allow the customer computing device to use the entire 800 GB capacity.

Rows 360 through 385 show that a functionality value of "02h", "03h", "04h", "05h", "06h", or "07h", requests a storage device to allocate 4.5 GB, 18.2 GB, 36.4 GB, 73.4 GB, 146.8 GB, or 300 GB of its capacity to a customer computing device, respectively. Row 390 shows that functionality values "08h" through "1fh" are reserved. As one skilled in the art can appreciate, different functionality levels may be assigned to particular functionality values other than what is shown in FIG. 3.

Figure 4:
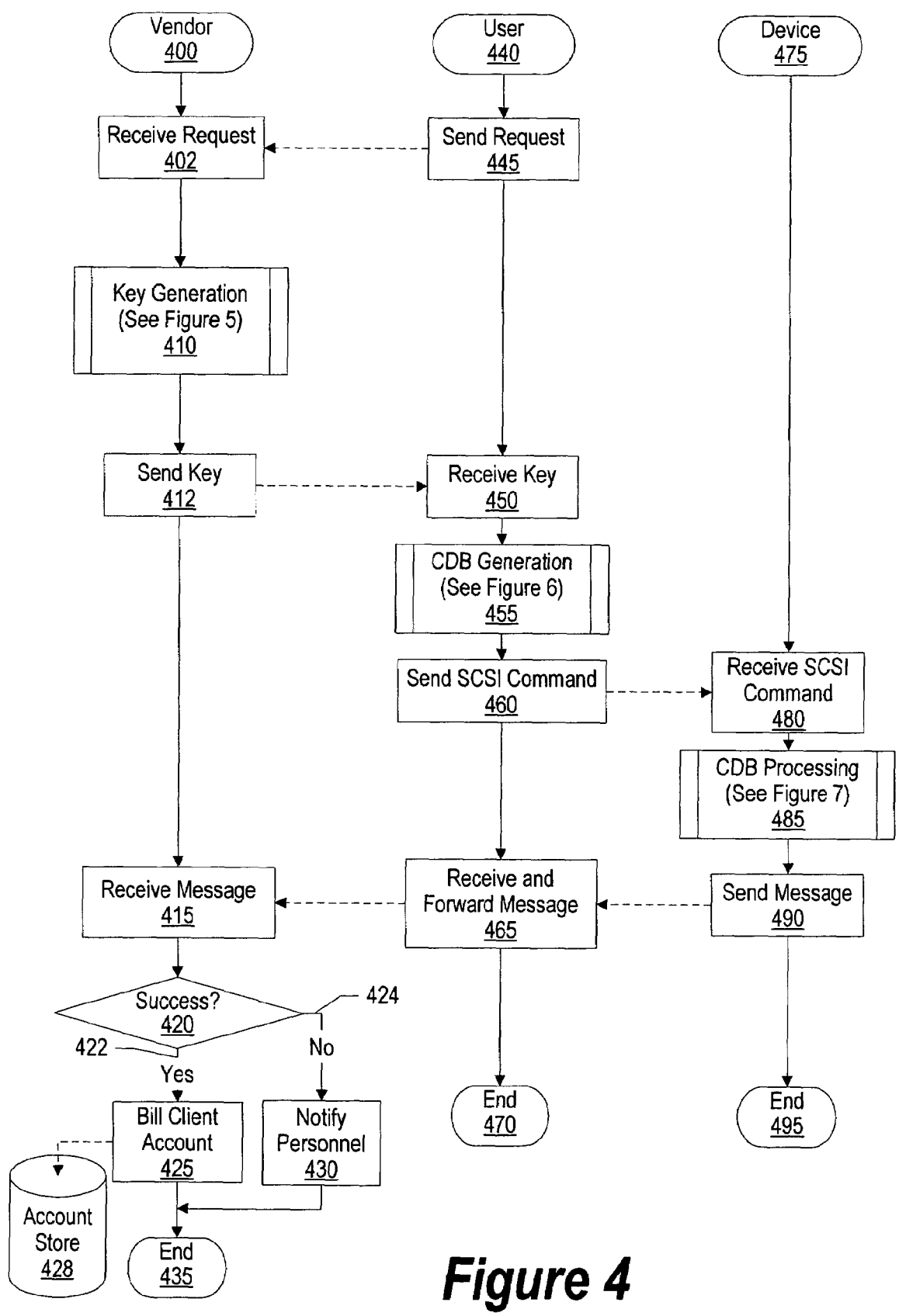
FIG. 4 is a high level flow chart showing steps taken in a user requesting a key from a vendor and extracting information from the key in order to increase the functionality of a SCSI device.

FIG. 4 is a high level flow chart showing steps taken in a user requesting a key from a vendor and extracting information from the key in order to increase the functionality of a SCSI device. User processing commences at 440, whereupon the user uses his customer computing device (i.e. a server, a personal computer, etc.) to send a request to a vendor at step 445. The request includes a request to increase the functionality of one of the user's SCSI devices. In one embodiment, the user provides functionality request information telephonically.

Vendor processing commences at 400, whereupon the vendor receives the user's request at step 402. Vendor processing generates a key in response to the request. The key includes a functionality value and a password corresponding to the user's particular SCSI device (pre-defined process block 410, see FIG. 5 and corresponding text for further details). After vendor processing generates the key, processing sends the key to the user's customer computing device at step 412.

The user's customer computing device receives the key at step 450. In one example, the user receives the key telephonically whereby the user enters the key into the user's customer computing device. The user's customer computing device extracts the functionality value and the password from the key, and includes them in a command descriptor block (pre-defined process block 455, see FIG. 6 and corresponding text for further details). After the customer computing device generates the command descriptor block, the customer computing device includes the command descriptor block into a SCSI command and sends the SCSI command to the user's SCSI device at step 460.

SCSI device processing commences at 475, whereupon the SCSI device receives the SCSI command from the customer computing device at step 480. SCSI device processing validates the password included in the command descriptor block and reconfigures itself based upon the functionality value included in the command descriptor block (pre-defined process block 485, see FIG. 7 and corresponding text for further details). SCSI device processing sends a message to the customer computing device which is an acknowledgement message, a password error message, or a functionality error message. An acknowledgement message signifies that the SCSI device accepted the command descriptor block and reconfigured itself based upon the command descriptor block's functionality value. A password error message signifies that the password included in the command descriptor block is invalid. A functionality error message signifies that the functionality value included in the command descriptor block is invalid. For example, a storage device may have a maximum capacity of 100 GB and the functionality value corresponds to a request to increase the device's capacity to 150 GB. In this example, the SCSI device sends a functionality error message to the customer computing device that indicates the functionality value discrepancy (see FIG. 7 and corresponding text for further details regarding device messages). SCSI device processing ends at 495.

The user's customer computing device receives the SCSI device's message at step 465, and forwards the message to the vendor. The message is forwarded to the vendor so that the vendor may charge the user for the functionality increase accordingly. For example, if the SCSI device sent an error message, the vendor should not charge the user for a functionality change.

Vendor processing receives the user's forwarded message at step 415. A determination is made as to whether the SCSI device's functionality change was successful (decision 420). If the SCSI device's functionality change was successful, decision 420 branches to "Yes" branch 422 whereupon processing bills the user's account located in account store 428 (step 425). Account store 428 may be stored on a nonvolatile storage area, such as a computer hard drive. On the other hand, if the SCSI device's functionality change was not successful, decision 420 branches to "No" branch 424 whereupon processing notifies personnel, such as a system administrator (step 430). For example, if the SCSI device did not validate a password, a system administrator may wish to troubleshoot the vendor's password retrieval mechanism. Vendor processing ends at 435.

Figure 5:
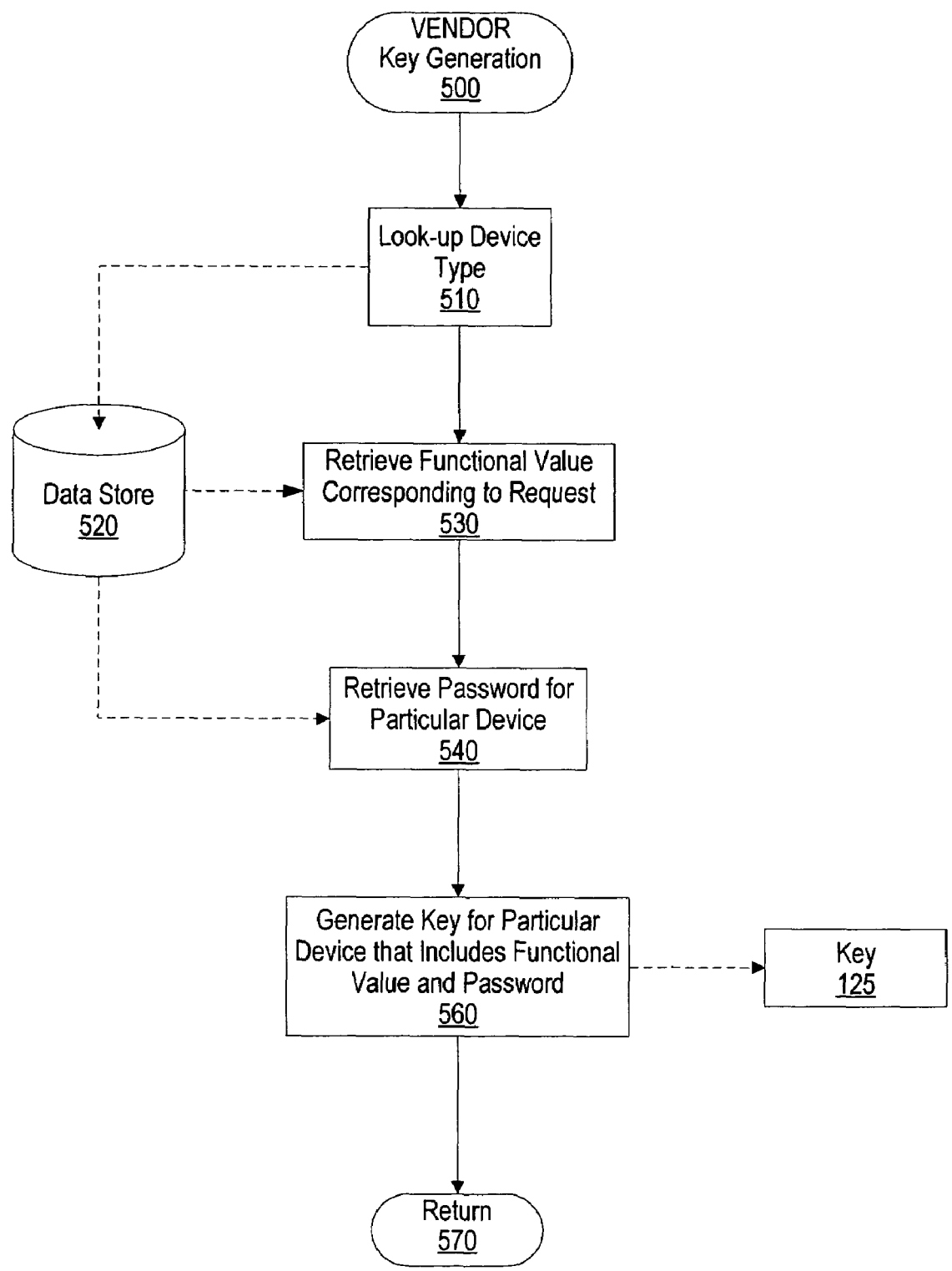
FIG. 5 is a flowchart showing steps taken in a vendor generating a key in response to a user request.

FIG. 5 is a flowchart showing steps taken in a vendor generating a key in response to a user request. The user request includes a request for a user to increase the functionality of one of its SCSI devices. For example, the user may wish to increase its allocated capacity of one of its storage devices from 10 GB up to 100 GB.

Vendor processing commences at 500, whereupon processing looks up the user's device type in data store 520 using request information which the vendor received from the user (step 510). Using the example described above, processing looks up the storage device using a particular identifier, such as the SCSI device's serial number. Data store 520 may be stored on a nonvolatile storage area, such as a computer hard drive.

Processing retrieves a functionality value corresponding to the user request at step 530. The functionality value is retrieved from a functionality value look-up table located in data store 520 (see FIG. 3 and corresponding text for further details regarding functionality values). Using the example described above, a user sent a request to a vendor requesting to increase the user's allocated capacity for its storage device to 100 GB and, therefore, vendor processing looks up a functionality value corresponding to 100 GB. Processing retrieves a password from data store 520 corresponding to the user's SCSI device at step 540. For example, a vendor may have configured a default password into the user's SCSI device at a time when the vendor installed the user's SCSI device.

Processing generates key 125 which includes the functionality value and the password at step 560. Key 125 is the same key that is shown in FIG. 1. Key 125 may be encrypted using various scrambling approaches, such as an exclusive-OR method or public key/private key. Vendor processing returns at 570.

Figure 6:
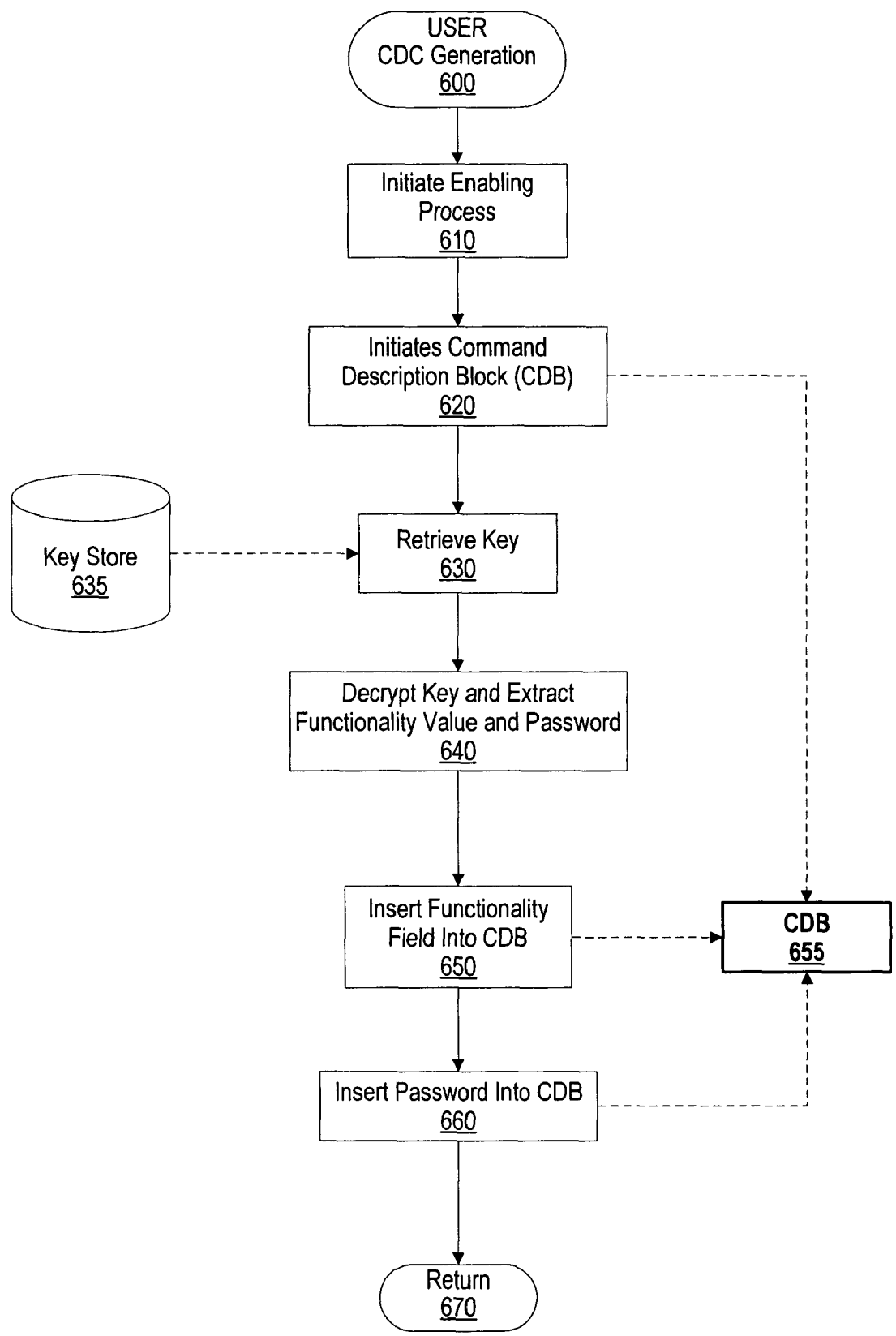
FIG. 6 is a flowchart showing steps taken in a user's customer computing device generating a command descriptor block using information included in a key which it received from a vendor.

FIG. 6 is a flowchart showing steps taken in a user's customer computing device generating a command descriptor block using information included in a key which it received from a vendor. User processing commences at 600, whereupon the user's customer computing device's operating system initiates an enabling process (step 610). The enabling process enables a SCSI device to report more capacity to a customer computing device because the operating system changes a SCSI device's defined capacity level within the customer computing device. Processing initiates a command descriptor block, such as command descriptor block 655, at step 620. Command descriptor block 655 is a command descriptor block that is included in SCSI command 155 which is shown in FIG. 1. Command descriptor block 655 includes various field attributes and is used to communicate with a SCSI device (see FIG. 2 and corresponding text for further details regarding command descriptor block properties).

Processing retrieves a key from key store 635 at step 630. The key was sent from a vendor and includes a functionality value and a password. (see FIG. 5 and corresponding text for further details regarding vendor key generation steps). Processing decrypts the key using standard decryption techniques (i.e. public key/private key) and extracts the functionality value and password at step 640. The functionality value and the password correspond to a particular SCSI device which the user wishes to reconfigure. Processing inserts the functionality value into command descriptor block 655's functionality field at step 650. The functionality field is a five-bit location included in a command descriptor block (see FIGS. 2, 3, and corresponding text for further details regarding functionality field properties). Processing inserts the extracted password into a three-byte area that is included in command descriptor block 655 at step 660 (see FIG. 2 and corresponding text for further details regarding password properties). Processing returns at 670.

Figure 7:
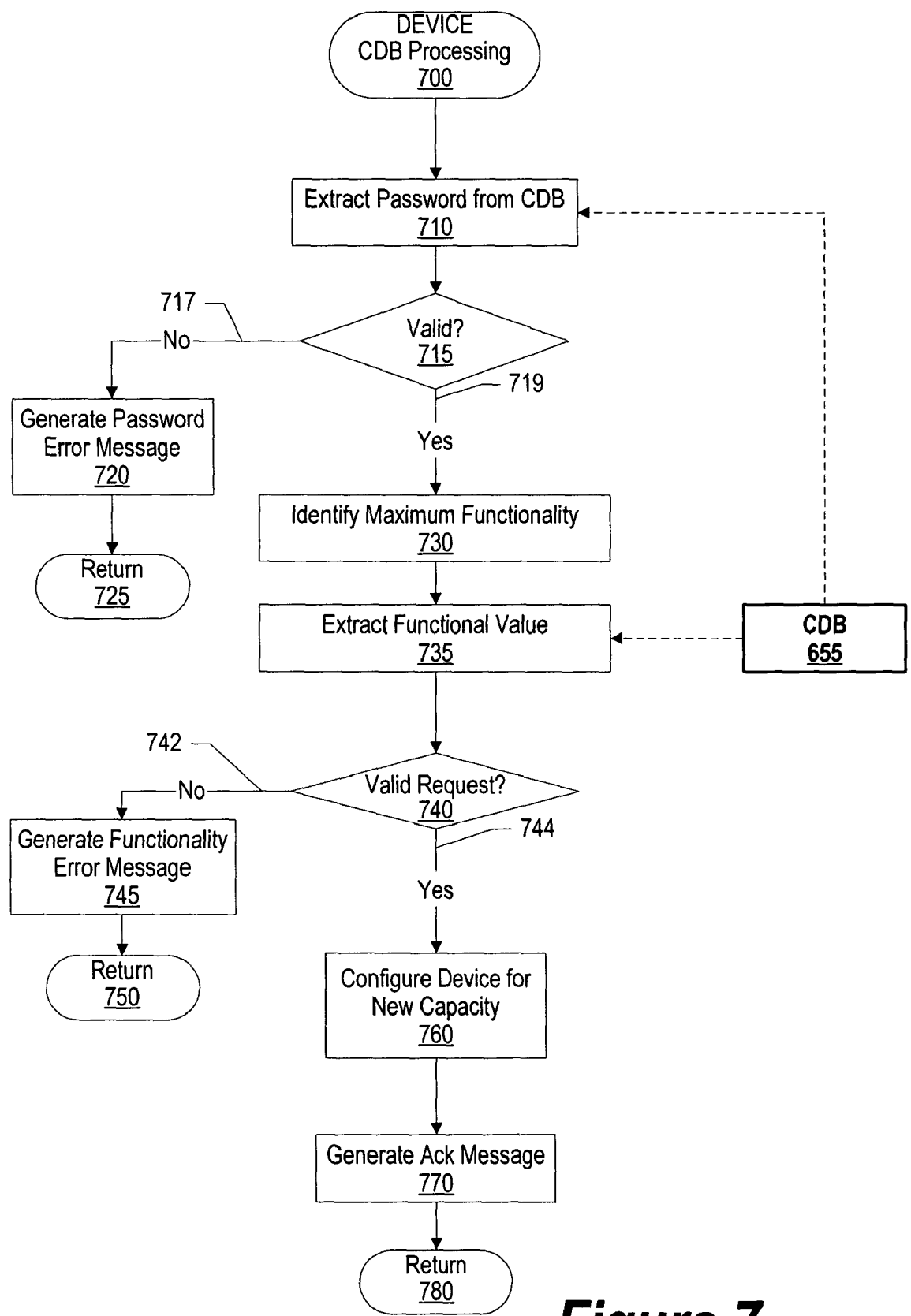
FIG. 7 is a flowchart showing steps taken in a SCSI device processing a command descriptor block which was included in a SCSI command that it received from a user's customer computing device.

FIG. 7 is a flowchart showing steps taken in a SCSI device processing a command descriptor block which was included in a SCSI command that it received from a user's customer computing device. SCSI device processing commences at 700, whereupon processing extracts a password from command descriptor block 655 (step 710). Command descriptor block 655 is the same command descriptor block that is shown in FIG. 6. The password is up to three bytes in length and corresponds to the particular SCSI device (see FIGS. 2, 3, and corresponding text for further details regarding password properties).

A determination is made as to whether the password is valid (decision 715). For example, processing may match the extracted password with a pre-defined password that was originally set by the SCSI device's vendor at time of manufacturing. If the extracted password is not valid, decision 715 branches to "No" branch 717 whereupon processing generates an error message at step 720, and processing returns at 725. On the other hand, if the extracted password is valid, decision 715 branches to "Yes" branch 719 whereupon processing identifies the SCSI device's maximum functionality at step 730. For example, if the device is a storage device, processing identifies the device's maximum storage capacity, such as 100 GB.

Processing extracts a functionality value from command descriptor block 655 at step 735. The functionality value corresponds to a new functionality level that is requested by user's customer computing device. A determination is made as to whether the functionality request is valid by comparing the SCSI device's maximum functionality with the extracted functionality value (decision 740). For example, if a storage device's maximum capacity is 100 GB and the functionality value corresponds to 150 GB, the request is not valid. If the request is not valid, decision 740 branches to "No" branch 742 whereupon processing generates a functionality error message at step 745, and processing returns at 750. On the other hand, if the request is valid, decision 740 branches to "Yes" branch 744 whereupon processing configures the SCSI device corresponding to the new functionality value (step 760). For example, if the functionality value corresponds to 80 GB, processing configures a storage device to allocate 80 GB to a user's customer computing device.

Processing generates an acknowledgement message at step 770 which indicates that the SCSI device accepted the functionality change, and processing returns at step 780.

Figure 8:
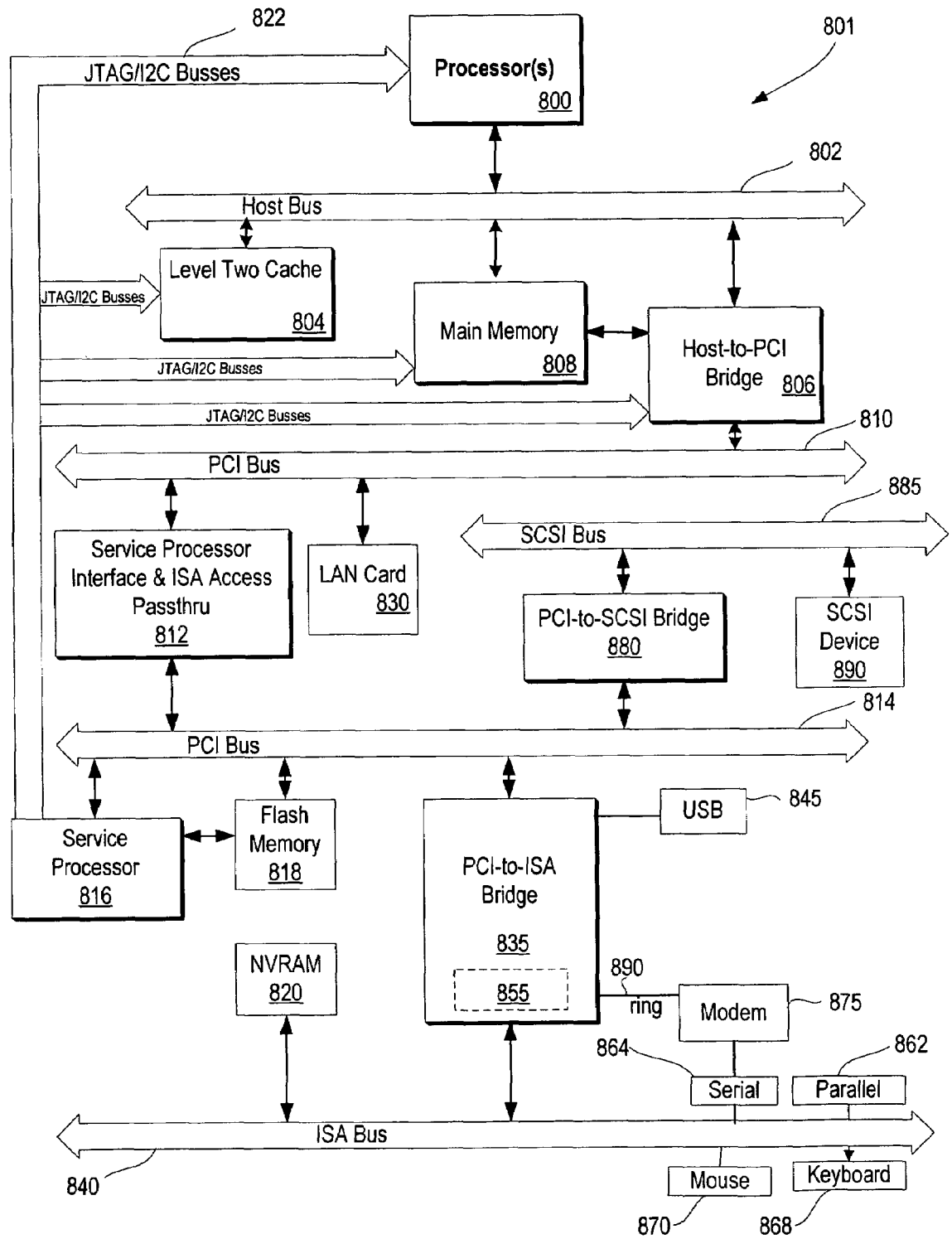
FIG. 8 is a block diagram of an information handling system capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. PCI-to-SCSI bridge 880 provides bus control to handle transfers between PCI bus 814 and SCSI bus 885. SCSI device 890 (i.e. a SCSI hard drive) communicates with other parts of computer system 801 using SCSI bus 885.

Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of inherently managing the functionality of a device, said method comprising:
generating a command descriptor block using a functionality value, the functionality value corresponding to a functionality level of the device; and
sending the command descriptor block to the device, the command descriptor block adapted to inherently change the functionality of the device corresponding to the functionality value.

2. The method as described in claim 1 further comprising:
sending a functionality request to a vendor; and
receiving a key from the vendor in response to the request, the key including the functionality value and a password.

3. The method as described in claim 2 further comprising:
extracting the functionality value and the password from the key; and
inserting the functionality value and the password in the command descriptor block.

4. The method as described in claim 3 further comprising:
receiving the command descriptor block at the device;
extracting the password from the command descriptor block at the device;
determining whether the password is valid at the device; and
receiving a password error message from the device based upon the determination.

5. The method as described in claim 1 further comprising:
receiving the command descriptor block at the device;
extracting the functionality value from the command descriptor block at the device;
determining whether the functionality value is valid at the device; and
receiving a functionality error message from the device based upon the determination.

6. The method as described in claim 1 wherein the command descriptor block is sent to the device from a vendor.

7. The method as described in claim 1 wherein the device includes a SCSI interface and wherein the command descriptor block is a SCSI command descriptor block.

8. An information handling system comprising:
one or more processors;
a memory accessible by the processors;
one or more nonvolatile storage devices accessible by the processors; and
a functionality management tool for managing the functionality of a device, the functionality management tool comprising software code effective to:
generate a command descriptor block using a functionality value, the functionality value corresponding to a functionality level of the device; and
send the command descriptor block to the device, the command descriptor block adapted to inherently change the functionality of the device corresponding to the functionality value.

9. The information handling system as described in claim 8 wherein the software code is further effective to:
send a functionality request to a vendor; and
receive a key from the vendor in response to the request, the key including the functionality value and a password.

10. The information handling system as described in claim 9 wherein the software code is further effective to:
extract the functionality value and the password from the key; and
insert the functionality value and the password in the command descriptor block.

11. The information handling system as described in claim 10 wherein the software code is further effective to:
receive the command descriptor block at the device;
extract the password from the command descriptor block at the device;
determine whether the password is valid at the device; and
receive a password error message from the device based upon the determination.

12. The information handling system as described in claim 8 wherein the software code is further effective to:
receive the command descriptor block at the device;
extract the functionality value from the command descriptor block at the device;
determine whether the functionality value is valid at the device; and
receive a functionality error message from the device based upon the determination.

13. The information handling system as described in claim 8 wherein the command descriptor block is sent to the device from a vendor.

14. A computer program product stored on a computer operable media for managing a device's functionality, said computer program product comprising:
means for generating a command descriptor block using a functionality value, the functionality value corresponding to a functionality level of the device; and
means for sending the command descriptor block to the device, the command descriptor block adapted to inherently change the functionality of the device corresponding to the functionality value.

15. The computer program product as described in claim 14 further comprising:
means for sending a functionality request to a vendor; and
means for receiving a key from the vendor in response to the request, the key including the functionality value and a password.

16. The computer program product as described in claim 15 further comprising:
means for extracting the functionality value and the password from the key; and
means for inserting the functionality value and the password in the command descriptor block.

17. The computer program product as described in claim 16 further comprising:
means for receiving the command descriptor block at the device;
means for extracting the password from the command descriptor block at the device;
means for determining whether the password is valid at the device; and
means for receiving a password error message from the device based upon the determination.

18. The computer program product as described in claim 14 further comprising:
means for receiving the command descriptor block at the device;
means for extracting the functionality value from the command descriptor block at the device;
means for determining whether the functionality value is valid at the device; and
means for receiving a functionality error message from the device based upon the determination.

19. The computer program product as described in claim 14 wherein the command descriptor block is sent to the device from a vendor.

20. The computer program product as described in claim 14 wherein the device includes a SCSI interface and wherein the command descriptor block is a SCSI command descriptor block.

* * * * *